United States Patent Office 3,694,270
Patented Sept. 26, 1972

3,694,270

HARD SUPERCONDUCTIVE MATERIALS AND METHOD OF PRODUCING THE SAME

Hermann Pfisterer and Isolde Dietrich, Munich, Germany, assignors to Siemens Aktiengesellschaft, Berlin and Munich, Germany No Drawing. Continuation-in-part of application Ser. No. 863,671, Sept. 18, 1969, which is a continuation of application Ser. No. 580,893, Sept. 21, 1966. This application Dec. 21, 1970, Ser. No. 100,430
Int. Cl. C22f *1/02, 1/11;* C21d *1/74*
U.S. Cl. 148—11.5 R 14 Claims

ABSTRACT OF THE DISCLOSURE

A relatively ductile hard-superconductive material and a method of producing the same wherein a matrix material (i.e. Cr) containing an embedded material (i.e. Nb) capable of combining with $O_2$, $N_2$ or mixture thereof to form a hard-superconductive compound is annealed in a gas of $O_2$, $N_2$ or a mixture thereof at time-temperature-pressure conditions so that the gas combines with the embedded material to form a hard-superconductive compound within the matrix material.

CROSS-REFERENCE TO RELATED APPLICATIONS

This is a continuation-in-part application of our copending application U.S. Ser. No. 863,671 filed Sept. 18, 1969 and now abandoned, which is in turn a continuation of our prior Ser. No. 580,893 filed Sept. 21, 1966 (now abandoned). The instant application claims priority for the common subject matter from said earlier application.

BACKGROUND OF THE INVENTION

Field of the invention

The invention relates to superconductors and more particularly to hard-superconductors and methods of producing the same.

Prior art

Various superconductive and hard-superconductive materials are known. Generally, these known materials comprise alloys or mixtures of individual superconductive materials, elements and compounds. Such superconductive materials are treated, as by annealing, to cause various internal rearrangements of the components thereof, with or without the addition of selected doping materials. Known superconductive materials are difficult to manufacture and are extremely brittle so that they cannot be worked into desired shapes or forms. This is especially noticeable with superconductive materials containing niobium nitride. Nevertheless, such niobium nitride containing superconductive materials are desirable since they exhibit a relatively high transition point of about 16° K. A transition point can be defined as a temperature at which the ohmic resistance disappears for an electrical current and a magnetic field strength approaching zero.

Accordingly, it is an object of the invention to provide a hard-superconductive material that is relatively easily workable and a method of producing the same; especially where such hard-superconductive materials include niobium nitride.

SUMMARY OF THE INVENTION

The invention provides a hard-superconductive material and a method of producing the same. The material embodiment comprises a matrix material having a hard-superconductive compound substantially homogeneously distributed therein. The compound is formed of an embedded material (which is potentially superconductive) capable of reacting with a gas of $N_2$, $O_2$ or mixtures thereof and said gas to form a hard-superconductive compound, and the matrix material is formed of a non-hardsuperconductive metal. The matrix material, the embedded metal and the gas are so chosen in relation to one another that the gas has solubility in the matrix material but has a greater affinity for the embedded metal and, at production temperatures, has a diffusion speed in the matrix material at least three times greater than the diffusion speed of the embedded metal in the matrix material. This relation allows the gas to enter the matrix material and combine with the embedded metal at the grain boundaries of the matrix, before the embedded metal can move from its substantially homogeneous dispersion within the matrix material.

The method embodiment comprises providing an amount of matrix material and a smaller amount of an embedded metal and substantially uniformly dispersing the embedded metal within the matrix material, and then annealing the resultant material in $O_2$, $N_2$ or mixture thereof gas at time-temperature-pressure conditions sufficient to deposit the forming compound of the embedded metal and gas having hard-superconductive characteristics at the grain boundaries of the matrix material. In certain embodiments the surfaces of the formed hard-superconductive materials of the invention are subjected to abrasive treatment to remove any matrix material-gas compound that may have formed at such surfaces. In other embodiments, the formed hard-superconductive materials are subjected to subsequent cold processing; and yet in other embodiments, the hard-superconductive materials are subjected to cold metal working, such as drawing operations in forming wires therefrom.

DESCRIPTION OF THE PREFERRED EMBODIMENTS

The invention provides, in its article embodiments, a hard-superconductive material comprised of a matrix material selected from non-hard-superconductive metals such as Cr, Mo, Tc, V alloys and mixtures thereof, having a hard-superconductive compound dispersed therein and selected from the group consisting of oxygen and hydrogen compounds of potentially superconductive metals, such as Nb, and including other potentially superconductive metals that can combine with oxygen, nitrogen or mixture thereof to form hard-superconductive compounds. The hard-superconductive compounds are preferably substantially homogeneously dispersed throughout the matrix.

The three components forming the hard-superconductive material of the invention, i.e. the matrix material, the potentially superconductive material (sometimes referred to as an embedded material or metal) and the selected gas, are carefully chosen in regard to one another. The gas is chosen so as to have a given solubility in the matrix material while having a much greater affinity for the potentially superconductive metal than for the matrix material. Additionally, at production temperatures (i.e. the temperatures utilized in forming the materials of the invention) the chosen gas has a diffusion speed or rate in the matrix material that is at least three times and preferably ten times greater than the diffusion speed of the potentially superconductive metal in the matrix material. The time-temperature-pressure conditions of formation for the hard-superconductive compound are carefully regulated so that this compound is preferably deposited within the interior of the matrix structure and most preferably at the grain boundaries thereof.

In one embodiment of the invention, the formed hard-superconductive material is beneficially treated with a subsequent cold process. In certain instances of such embodiment, intermedaite annealing is utilized prior to the cold process.

The principles of the invention may be better understood from the following theories, although it will be understood that the invention is not limited by such theories. Generally, in hard-superconductive materials it appears that high critical current-density values are obtained by high superconductive currents in a small zone at the phase interfaces thereof. Accordingly, in order to obtain a high critical currents density value of such materials, the materials must be permeated by as dense a grid or network of phase interphases as possible. Such a phase interface grid will exhibit superconductive qualities, and can exist between two superconductive phases or between one superconductive phase and a normally conductive phase. In accordance with the principles of the invention, deposition of a hard-superconductive compound (i.e. NbN) at grain boundaries of a normally conductive matrix material (i.e. Cr) forms such a grid and high critical current-density values are achieved.

Additionally, the concepts and principles of the invention can be better understood from an exemplary hard-superconductive material of the invention and a process in accordance with the principles of the invention and for this particular material, and such embodiments are hereinbelow; although it is to be understood that the invention is not limited to this particular material or to its particular production parameters.

An embodiment of a hard-superconductive material of the invention comprises a Cr-matrix having a NbN compound substantially homogeneously distributed therein. The selection of Cr (or Cr alloy) as a matrix material, of Nb as a potentially-superconductive metal capable of forming a hard-superconductive compound, when reacted with a gas of $N_2$, $O_2$ or mixture thereof, and $N_2$ as the suitably reactive gas satisfied the above noted requirements for components forming the hard-superconductive material of the invention. Nitrogen has a considerable degree of solubility in chromium but its affinity for niobium is far greater than its affinity for chromium. Also, the diffusion speed of nitrogen, at production temperatures, in the chromium (or an alloy thereof) matrix is much greater than the diffusion speed of niobium in the chromium matrix. Accordingly, during production nitrogen travels to the niobium distributed within the chromium matrix to combine therewith, and niobium does not travel, to any appreciable degree, from its substantial homogeneous or uniform distribution within the matrix toward the exterior surfaces of the matrix. Thus, the proper selection of components assures that the homogenerous distribution of the potentially-superconductive metal, in the instant example niobium, within the matrix is retained and that the forming niobium-nitride is likewise homogeneously distributed throughout the matrix. The homogeneous distribution of the potentially-superconductive metal within the matrix material is achieved in a number of ways, such as by forming an alloy thereof or forming other suitable mixtures.

Analogously to the embodiment described, other combinations of components satisfying the noted requirements are utilizable to form the hard-superconductive materials of the invention. Thus, combinations of Cr-Mo-N; Cr-Tc-N; Cr-V-N-O; Cr-Nb-N-O; Cr-V-N; Cr-Zr-N; etc. as well as other combinations of suitable materials (whose properties are listed in various pertinent Handbooks or like publications) are within the scope of the invention and form hard-superconductive materials as explained in conjunction with the Cr-Nb-N embodiment.

In the method embodiments of the invention, a given amount of the various components are provided, the potentially-superconductive metal is substantially uniformly dispersed within the matrix material and the resultant non-hard-superconductive material is subjected to annealing conditions in an atmosphere $O_2$, $N_2$ or mixture thereof at temperature-time-pressure conditions sufficient to form the hard-superconductive compound within the matrix material and preferably at the grain boundaries thereof.

The amount of the potentally-superconductive or embedded metal, i.e. (Nb) distributed within the matrix material (i.e. Cr) is preferably fairly low. Concentrations of the potentially-superconductive metal up to about 10% are utilized and generally the concentration may range from about 1% to about 10%. At such concentration, excessive brittleness of the resultant hard-superconductive material is avoided and excessive layer thickness of the formed hard-superconductive compounds is avoided so that diffusion of the gas (i.e. $N_2$) is not materially restricted thereby.

The annealing temperatures (sometimes referred to herein as production temperatures) are selected sufficiently high to insure that a proper deposition of the forming hard-superconductive compounds occurs within the matrix material. Preferably, such depositions take place at the grain boundaries of the matrix material. Generally, the lower the annealing temperature, the smaller are the deposited particles or layers and the higher are the critical current-density values of the resultant hard-superconductive material so-produced. However, at too low of annealing temperatures the formation of hard-superconductive compounds is materially retarded or slowed down. Accordingly, the annealing temperature is selected so as to balance these competing factors and is preferably in the range of about 1000° to 1500° C. This range of annealing temperatures is especially suitable for the formation of the NbN compound within various matrix materials.

The annealing times are selected in accordance with the annealing temperatures and in accordance with the dimensions of the specimen being formed, i.e. its cross-section. The thicker or greater the dimension of the specimen being annealed, the longer the annealing time required, since diffusion of a particular gas through such specimen will occupy a greater period of time. However, with an excessively long annealing time period, particularly at higher pressures, a corrosion layer (i.e. scale-like layer) of excessive thickness forms on the surfaces of the specimen, comprising a compound of the gas and the matrix material. In the exemplary embodiment discussed, such a layer, if allowed to form would be composed of chromium nitride. This corrosive layer detracts from the desirable properties of the formed hard-superconductive material and is to be avoided. While a very short annealing time period will not allow sufficient diffusion of the gas to take place so that insufficient amounts of the hard-superconductive compounds are deposited within the matrix. Accordingly, the annealing time period is selected so as to range from about 1 to 4 hours.

In those instances where a reaction does occur between the matrix material and the gas to form the undesirable layer, particularly at the surfaces of the specimen, such layer is removed by suitable abrasive operations, such as by grinding or the like.

The annealing pressure (attained by pressurizing the gas component utilized) is maintained sufficiently low to insure that the number of gas particles or the like diffusing into the matrix material per unit of time and unit of surface of the specimen is relatively low. A diffusion of a quantitatively excessive number of gas particles provides an amount of gas that is not substantially absorbed by or reacted with only the potentially-superconductive metal but also reacts with the matrix material so that the undesirable layer of a compound of matrix material-gas forms. Accordingly, the annealing gas pressure is regulated so as to range from about $10^{-3}$ to $10^{-6}$ torr.

The specific method or production parameters for any particular set of selected components are readily determined by a number of routinely simple tests. Thus, at a production stage no later than cutting, it can be observed if a particular selection of parameters and their relation to one another was proper and adjustments made accordingly.

In a further embodiment of the invention, the formed hard-superconductive materials of the invention are subjected to a cold process. Cold processing of the formed material causes the deposited hard-superconductive compound at the grain boundaries (i.e. NbN in the exemplary embodiment) to attain a preferred directional alignment, as in a lamina-like structure. In this manner, anisotropical superconductive properties are attained within the hard-superconductive materials of the invention, as desired.

The hard-superconductive materials of the invention have a wide range of uses. The materials of the invention are relatively ductile and can be worked into shapes as desired, for example into wires by a cold-drawing process.

Various other modifications and changes can be effected without departing from the spirit and scope and novel concepts of the instant invention.

We claim:

1. A method of producing a hard-superconductive material comprising the steps of subjecting a non-hard-superconductive material to annealing temperature-time-pressure conditions in a gas atmosphere selected from the group consisting essentially of $O_2$, $N_2$ and mixtures thereof sufficient to form a hard-superconductive compound within said material; and non-hard-superconductive material being capable of combining with said gas to form bedded material substantially uniformly distributed throughout said matrix material, said embedded material being capable of combining with said gas to form a compound exhibiting hard-superconductive characteristics, said matrix material, said embedded material and said gas being so selected in relation to each other that the gas is soluble in said matrix material and has a substantially greater affinity for the embedded material than for the matrix material and has, at the annealing temperatures, a diffusion speed in the matrix material that is at least three times greater than the diffusion speed of the embedded material in the matrix material, and adjusting said annealing conditions in relation to one another so that deposition of the thus-formed compound exhibiting hard-superconductive characteristics occurs within said matrix material.

2. A method as defined in claim 1 wherein the annealing conditions are adjusted so that deposition of the thus-formed compound exhibiting hard-superconductive characteristics occurs at grain boundaries of the matrix material.

3. A method as defined in claim 1 wherein the annealing temperature ranges from about 1000° C. to about 1500° C., the annealing time ranges from about 1 hour to about 4 hours and the annealing pressure ranges from about $10^{-3}$ torr to about $10^{-6}$ torr.

4. A method as defined in claim 1 wherein the concentration of the embedded material within the matrix material ranges from about 1% to about 10% based on the weight of said matrix material.

5. A method as defined in claim 1 wherein the matrix material is selected from the group consisting of chromium and chromium alloys, the embedded material is niobium and the gas is nitrogen.

6. A method as defined in claim 1 including an additional step of subjecting the produced hard-superconductive material to cold processing so as to attain a directional alignment of the formed compound within the matrix.

7. A method as defined in claim 1 including an additional step of subjecting the produced hard-superconductive material to a cold metal working process.

8. A method as defined in claim 1 wherein any product formed on a surface of the hard-superconductive material by a combination of the matrix material and the gas is removed.

9. A method of producing a hard-superconductive material comprising the steps of subjecting a non-hard-superconductive material to annealing temperature-time-pressure conditions in a nitrogen gas atmosphere sufficient to form a hard-superconductive compound within said material; said non-hard-superconductive material being comprised of a matrix material and an embedded material substantially uniformly distributed throughout capable of combining with said gas to form a compound said matrix material, said embedded material being exhibiting hard-superconductive characteristics, said matrix material, said embedded material and said gas being so selected in relation to each other that the gas is soluble in said matrix material and has a substantially greater affinity for the embedded material than for the matrix material and has, at the annealing temperatures, a diffusion speed in the matrix material that is at least three times greater than the diffusion speed of the embedded material in the matrix material, and adjusting said annealing conditions in relation to one another so that deposition of the thus-formed compound exhibiting hard-superconductive characteristics occurs within said matrix material.

10. A method of producing a hard-superconductive material comprising the steps of subjecting a non-hard-superconductive material to annealing temperature-time pressure conditions in an oxygen gas atmosphere sufficient to form a hard-superconductive compound within said material; said non-hard-superconductive material being comprised of a matrix material and an embedded material substantially uniformly distributed throughout said matrix material, said embedded material being capable of combining with said gas to form a compound exhibiting hard-superconductive characteristics, said matrix material, said embedded material, and said gas being so selected in relation to each other that the gas is soluble in said matrix material and has a substantially greater affinity for the embedded material than for the matrix material and has, at the annealing temperatures, a diffusion speed in the matrix material that is at least three times greater than the diffusion speed of the embedded material in the matrix material, and adjusting said annealing conditions in relation to one another so that deposition of the thus-formed compound exhibiting hard-superconductive characteristics occurs within said matrix material.

11. A hard-superconductive material comprising a matrix material and a compound exhibiting hard-superconductive characteristics substantially uniformly distributed throughout said matrix material, said compound consisting essentially of a material capable of combining with a gas selected from the group consisting essentially of $N_2$, $O_2$ and mixtures thereof to form said compound and a gas selected from said group, said matrix material, said material capable of combining with a gas, and said gas being so selected in relation to each other that the gas is soluble in the matrix material and has a substantially greater affinity for the material capable of combining with the gas and, at annealing temperatures, has a diffusion speed in the matrix material that is at least three times greater than the diffusion speed of the material capable of combining with the gas in the matrix material.

12. A hard-superconductive material as defined in claim 11 wherein the amount of the material capable of combining with gas in the matrix material ranges from about 1% to about 10% of said matrix material.

13. A hard-superconductive material comprising a matrix material selected from the group consisting essentially of chromium and chromium alloys and a niobium nitride compound exhibiting hard-superconductive characteristics substantially uniformly distributed throughout said matrix material.

14. A hard-superconductive material as defined in claim 11 wherein said material has anisotropical superconductive characteristics.

References Cited

UNITED STATES PATENTS

| | | | |
|---|---|---|---|
| 3,275,480 | 9/1966 | Betterton, Jr. et al. | 148—133 |
| 3,429,032 | 2/1969 | Martin et al. | 29—194 |

OTHER REFERENCES

Livingston, J. D.; "Making Superconductors Hard," Journal of Metals, vol. 18, No. 6; pp. 698–704, June 1966.

WAYLAND W. STALLARD, Primary Examiner

U.S. Cl. X.R.

148—20.3, 32, 133

UNITED STATES PATENT OFFICE
CERTIFICATE OF CORRECTION

Patent No. 3,694,270 Dated September 26, 1972

Inventor(s) Hermann Pfisterer and Isulde Dietrich

It is certified that error appears in the above-identified patent and that said Letters Patent are hereby corrected as shown below:

Column 5, line 39, change "and" to read --said--;

linr 40, change "capable" to read --comprised--.

Signed and sealed this 6th day of August 1974.

(SEAL)
Attest:

McCOY M. GIBSON, JR.
Attesting Officer

C. MARSHALL DANN
Commissioner of Patents

PO-1050 (10-69)

USCOMM-DC 60376-P69
☆ U.S. GOVERNMENT PRINTING OFFICE : 1969 O—366-334